(12) United States Patent
Hazan et al.

(10) Patent No.: US 10,013,539 B1
(45) Date of Patent: Jul. 3, 2018

(54) RAPID DEVICE IDENTIFICATION AMONG MULTIPLE USERS

(71) Applicant: EMC Corporation, Hopkinton, MA (US)

(72) Inventors: Alon Hazan, Ramat Gan (IL); Marcelo Blatt, Modiin (IL); Zohar Duchin, Hertzliya (IL); Alex Zaslavsky, Peteh Tiqwa (IL); Shay Amram, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 299 days.

(21) Appl. No.: 14/866,139

(22) Filed: Sep. 25, 2015

(51) Int. Cl.
*G06F 21/00* (2013.01)
*G06F 21/31* (2013.01)
*H04L 9/32* (2006.01)

(52) U.S. Cl.
CPC .......... *G06F 21/316* (2013.01); *H04L 9/3247* (2013.01)

(58) Field of Classification Search
CPC ....... G06F 21/316; G06F 21/44; H04L 9/3247
See application file for complete search history.

(56) References Cited

U.S. PATENT DOCUMENTS

| | | | |
|---|---|---|---|
| 5,835,087 A * | 11/1998 | Herz | G06Q 20/383 348/E7.056 |
| 7,403,922 B1 | 7/2008 | Lewis et al. | |
| 7,827,186 B2 * | 11/2010 | Hicks | G06Q 30/0603 707/749 |
| 7,865,427 B2 | 1/2011 | Wright et al. | |
| 7,908,645 B2 | 3/2011 | Varghese et al. | |
| 7,970,701 B2 | 6/2011 | Lewis et al. | |
| 8,019,678 B2 | 9/2011 | Wright et al. | |
| 8,184,813 B2 | 5/2012 | Kaji | |
| 8,549,595 B1 | 10/2013 | Vaisman et al. | |
| 8,572,391 B2 | 10/2013 | Golan et al. | |

(Continued)

FOREIGN PATENT DOCUMENTS

WO    WO 2013115807 A1 *    8/2013    ............ H04W 12/08

OTHER PUBLICATIONS

AES Key Wrap Specification; Nov. 2001; 23 pages.
(Continued)

*Primary Examiner* — Tri Tran
(74) *Attorney, Agent, or Firm* — BainwoodHuang

(57) ABSTRACT

Techniques of performing authentication involve comparing current user authentication factors with previous authentication factors selected from multiple users during a single authentication session. Along these lines, suppose that an authentication server receives current browser characteristics from a user computer during a current authentication session. Based on the current browser characteristics, the authentication server selects previous browser characteristics received from devices used by multiple users during previous authentication sessions. For example, the authentication server may select previous browser characteristics based on the whether any of the results of a modified, locally sensitive hashing (LSH) of the previous browser characteristics match any of the results of a modified LSH of the current browser characteristics. After the authentication server selects the previous browser characteristics, the authentication server compares those selected, previous browser characteristics with the current browser characteristics.

19 Claims, 7 Drawing Sheets

(56) References Cited

U.S. PATENT DOCUMENTS

| | | |
|---|---|---|
| 8,701,199 B1 | 4/2014 | Dotan et al. |
| 8,781,975 B2 | 7/2014 | Bennett et al. |
| 8,832,790 B1 | 9/2014 | Villa et al. |
| 8,973,096 B1 | 3/2015 | Villa et al. |
| 9,160,742 B1 | 10/2015 | Ackerman et al. |
| 9,239,908 B1 | 1/2016 | Constantine |
| 9,338,187 B1 | 5/2016 | Oprea et al. |
| 9,667,611 B1 * | 5/2017 | Friedman ................ H04L 63/08 |
| 2005/0086471 A1 | 4/2005 | Spencer |
| 2005/0232470 A1 * | 10/2005 | Chaudhari ......... G07C 9/00158 |
| | | 382/115 |
| 2008/0209227 A1 * | 8/2008 | Venkatesan ........... H04L 9/3231 |
| | | 713/186 |
| 2013/0151519 A1 * | 6/2013 | Akhin ............... G06F 17/30705 |
| | | 707/737 |
| 2013/0263282 A1 * | 10/2013 | Yamada ................. G06F 21/32 |
| | | 726/28 |
| 2015/0026027 A1 | 1/2015 | Priess et al. |
| 2015/0244706 A1 * | 8/2015 | Grajek ................ H04L 63/0815 |
| | | 726/6 |

OTHER PUBLICATIONS

J. Schaad; "Advanced Encryption Standard (AES) Key Wrap Algorithm"; Sep. 2002; downloaded from <https://tools.ietf.org/rvd/rfc3394> on Jul. 24, 2015; 30 pages.

Di Shamir; "How to Share a Secret"; Nov. 1979; vol. 22; No. 11; 2 pages.

* cited by examiner

Match subsignatures
to existing
subsignatures from
previous devices 218

| Hash Table 510 | |
|---|---|
| Hash Value | Device IDs |
| 00000 | 134(5132),..., 134(7928) |
| 00001 | 134(12),..., 134(9121) |
| ... | ... |
| 24198 | 134(61) |
| ... | ... |
| 45678 | 134(61), 134(1457) |
| ... | ... |
| 71371 | 134(984) |
| ... | ... |
| 99231 | 134(2) |
| ... | ... |

*FIG. 5*

Comparison Process 610

Form a similarity matrix
612

Similarity Matrix 620

| | Acc_Lan | Brow_Lan | Disp | Geo | SW | Sys_Lan | TZ | User_Ag | User_Lan |
|---|---|---|---|---|---|---|---|---|---|
| 134(2) | 010 | 001 | 100 | 100 | 010 | 100 | 001 | 010 | 100 |
| 134(61) | 100 | 100 | 100 | 100 | 010 | 100 | 100 | 010 | 100 |
| 134(984) | 010 | 001 | 010 | 001 | 010 | 100 | 001 | 001 | 100 |
| 134(1457) | 100 | 001 | 100 | 100 | 100 | 100 | 001 | 010 | 100 |

100 = same; 001 = different; 010 = missing information

Perform SVD on similarity matrix
614

*FIG. 6*

RAPID DEVICE IDENTIFICATION AMONG MULTIPLE USERS

BACKGROUND

A conventional approach to authenticating a user involves comparing current user authentication factors with previous user authentication factors. If the current user authentication factors closely match the previous user authentication factors, then the risk is low that the user is an imposter. However, if the current user authentication factors do not closely match the previous user authentication factors, then the risk is high that the user is an imposter.

Along these lines, suppose that an authentication server receives current browser characteristics (e.g., browser type, browser version, a cookie, browser language, etc.) from a user computer during a current authentication operation. A close match between the current browser characteristics and previous browser characteristics for the legitimate user indicates a low risk that the human operating the user computer is an imposter. However, a poor match between the current browser characteristics and the previous browser characteristics indicates greater risk that the human operating the user computer is an imposter.

SUMMARY

Unfortunately, there are deficiencies in the above-identified conventional approach to authenticating a user that involves simply comparing current user authentication factors to previous user authentication factors. For example, from the same computer, suppose that a fraudster tries authenticating as a first user, and then tries authenticating as a second user, and so on. In such a situation, the authentication server compares the current user authentication factors to previous user authentication factors for the first user, and then compares the current user authentication factors to previous user authentication factors for the second user, and so on. Accordingly, the authentication server is unlikely to discover that the fraudster is attempting to authenticate as different users while using the same computer.

In contrast to the conventional approach to authenticating a user that is unlikely to detect a fraudster trying to authenticate as multiple users, improved techniques involve comparing current user authentication factors with previous authentication factors selected from multiple users during a single authentication session. Along these lines, suppose that an authentication server receives current browser characteristics from a user computer. Based on the current browser characteristics, the authentication server selects previous browser characteristics received from devices used by multiple users. For example, the authentication server may select previous browser characteristics based on the whether any of the results of a modified, locally sensitive hashing (LSH) of the previous browser characteristics match any of the results of a modified LSH of the current browser characteristics. After the authentication server selects the previous browser characteristics, the authentication server compares those selected, previous browser characteristics with the current browser characteristics. If there is a close match, then it is likely that the current browser characteristics were received from a fraudster attempting to authenticate as different users while using the same computer.

Advantageously, the improved techniques make it feasible for the authentication server to detect a fraudster attempting to authenticate as different users while using the same computer. While the conventional approach is limited to considering previous user authentication factors from the same user for comparison with the current user authentication factors, the improved techniques provide a way for the authentication server to shrink the number of comparable sets of previous user authentication factors down to a manageable amount. In this way, the authentication server may then perform a comparison of current user authentication factors with previous user authentication factors for multiple users in a single authentication session.

One embodiment of the improved techniques is directed to a method of performing authentication. The method includes receiving, by processing circuitry, a current set of device attributes from a current user device. The method also includes selecting, from previous sets of device attributes collected from multiple previous user devices and by the processing circuitry, comparable sets of device attributes based on the current set of device attributes. The method further includes comparing, by the processing circuitry, the current set of device attributes with each comparable set of device attributes to ascertain whether the current user device is operated by a legitimate user.

Additionally, some embodiments are directed to an apparatus constructed and arranged to perform authentication. The apparatus includes a network interface, memory and controlling circuitry coupled to the memory. The controlling circuitry is constructed and arranged to carry out a method of performing authentication.

Further, some embodiments are directed to a computer program product having a non-transitory, computer-readable storage medium which stores executable code, which when executed by a controlling circuitry, causes the controlling circuitry to perform a method of performing authentication.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in performing authentication by comparing selected sets of device attributes taken from of a large pool of sets of device attributes to a current set of device attributes.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 5 is a block diagram illustrating an example hash table for matching subsignatures within the electronic environment illustrated in FIG. 1.

FIG. 6 is a flow chart illustrating an example attribute comparison process within the electronic environment illustrated in FIG. 1.

DETAILED DESCRIPTION

Improved techniques of performing authentication involve comparing current user authentication factors with previous authentication factors selected from multiple users during a single authentication session. Along these lines, suppose that an authentication server receives current browser characteristics from a user computer during a current authentication session. Based on the current browser characteristics, the authentication server selects previous browser characteristics received from devices used by multiple users during previous authentication sessions. For example, the authentication server may select previous browser characteristics based on the whether any of the results of a modified, locally sensitive hashing (LSH) of the previous browser characteristics match any of the results of a modified LSH of the current browser characteristics. After the authentication server selects the previous browser characteristics, the authentication server compares those selected, previous browser characteristics with the current browser characteristics. If there is a close match, then it is likely that the current browser characteristics were received from a fraudster attempting to authenticate as different users while using the same computer.

Advantageously, the improved techniques make it feasible for the authentication server to detect a fraudster attempting to authenticate as different users while using the same computer. While the conventional approach is limited to considering previous user authentication factors from the same user for comparison with the current user authentication factors, the improved techniques provide a way for the authentication server to shrink the number of comparable previous user authentication factors down to a manageable amount. In this way, the authentication server may then perform a comparison of current user authentication factors with previous user authentication factors for multiple users in a single authentication session.

Figure 1:
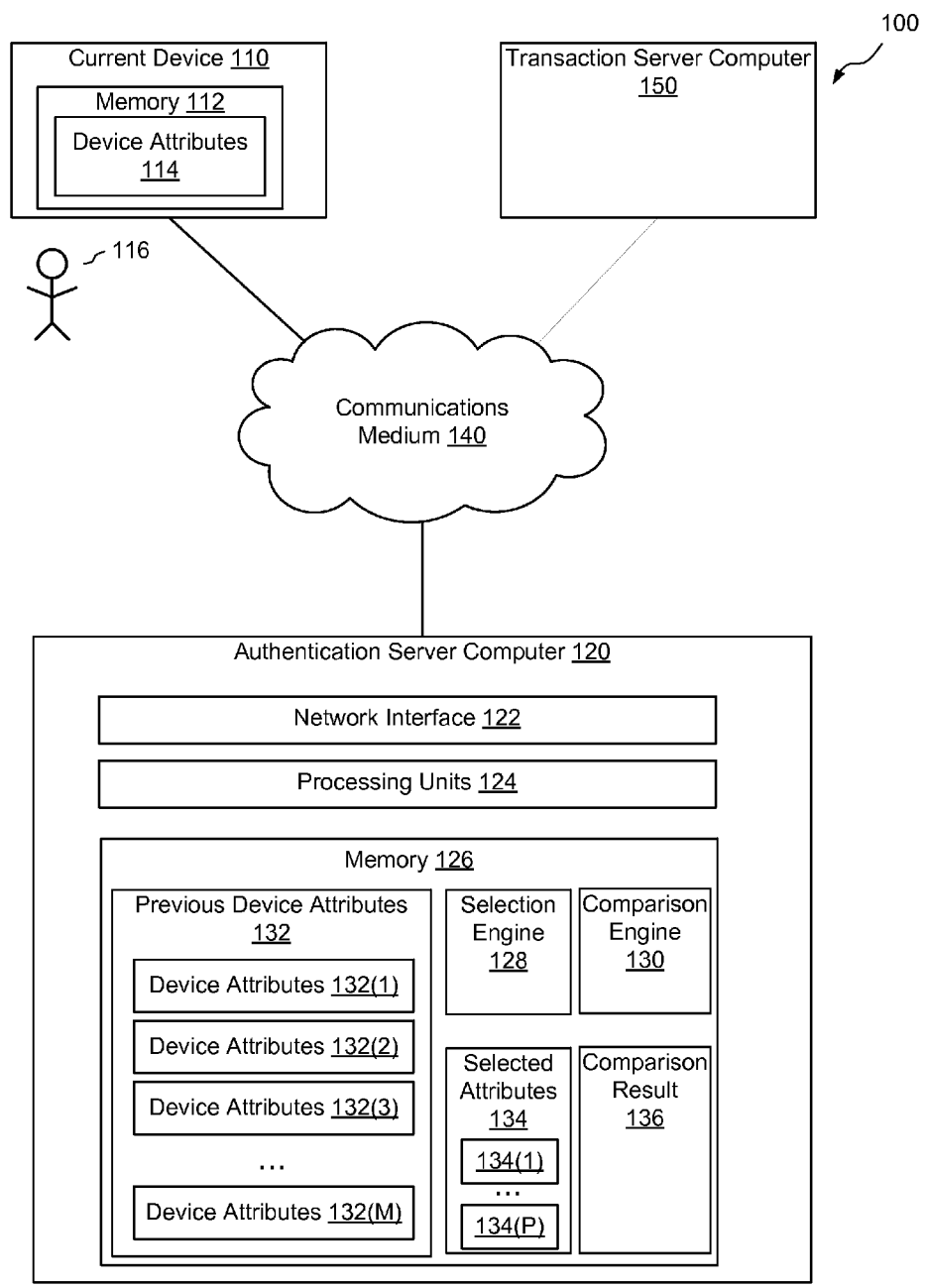
FIG. 1 is a block diagram illustrating an example electronic environment in which the improved technique can be carried out.

FIG. 1 shows an example electronic environment 100 in which embodiments of the improved techniques hereof can be practiced. The electronic environment 100 includes a current device 110, an authentication server computer 120, a communications medium 140, and a transaction server computer 150.

The current device 110 is constructed and arranged to transmit information to the transaction server computer 150 in the course of requesting the processing of a current transaction. The current device 110 may take the form of a desktop computer, laptop computer, tablet computer, smartphone, or the like. The current device 110 includes a memory 112, on which is stored a set of device attributes 114.

The set of device attributes 114 may include various software configuration settings that define a state of the current device 110 at a point in time. Typical device attributes include a browser language, a system language, a time zone, an operating system identifier, a browser identifier, and display settings. In some arrangements, the set of device attributes 114 may also include a geolocation.

Figures 2A, 2B:
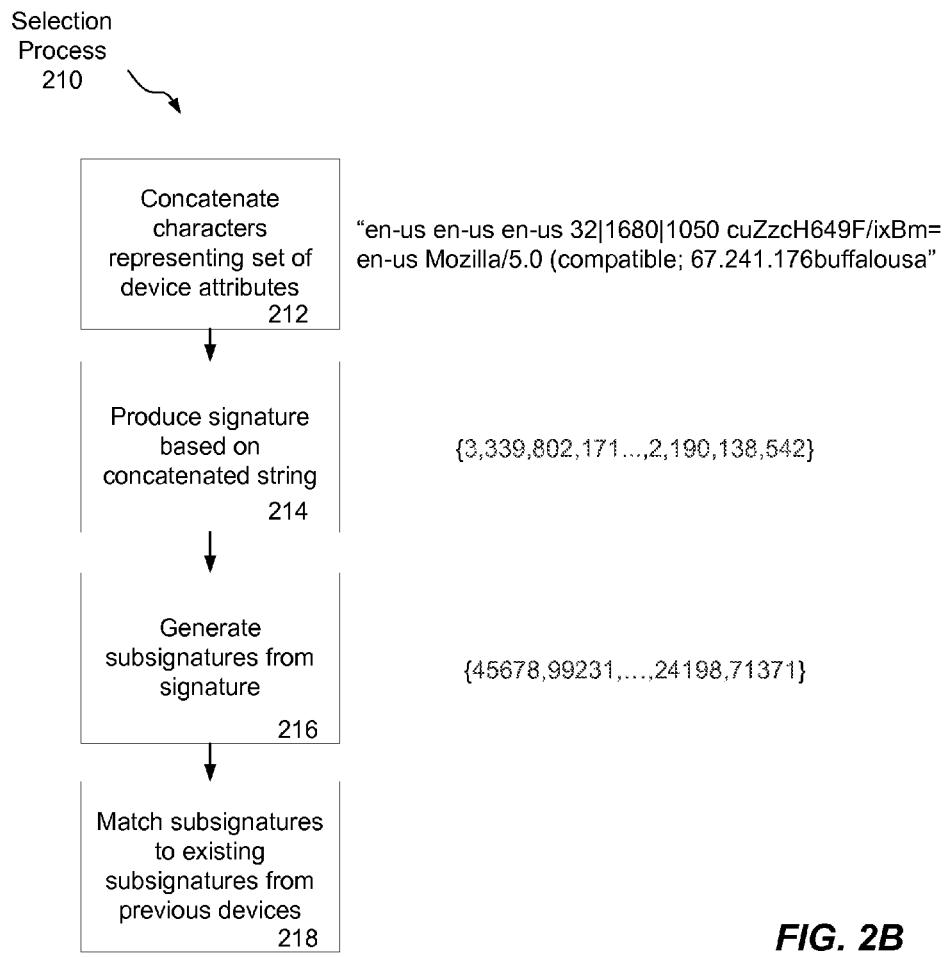
FIG. 2A is a block diagram illustrating example device attributes within the electronic environment illustrated in FIG. 1.
FIG. 2B is a flow chart illustrating an example selection process within the electronic environment illustrated in FIG. 1.

FIG. 2A illustrates an example set of device attributes 114. This set of device attributes 114 has values of nine features that describe the state of the current device 110 at a point in time. The format of each value is typical but may take other forms. It should be understood that the features shown here represent typical features transmitted from devices such as the current device 110 in the course of requesting a transaction. Nevertheless, such figures in aggregate are a reliable indicator of the identity of the current device 110 at a point in time. While other device features, such as a MAC address, may be considered as a unique identifier of a device, such features have historically been deliberately hacked by a malicious actor and as such are less reliable as a device identifier than configuration settings.

The configuration settings shown in FIG. 2A, while more dependable than unique identifiers that may be hacked, have the disadvantage that their values may change over time. For example, the user 116 may change the browser software used in the current device 110. In that case, the value of the software identifier may change even though the current device 110 has not changed. Thus, the act of comparing devices is more complicated than simply matching values of each feature.

Returning to FIG. 1, the authentication server computer 120 is constructed and arranged to process a large number of authentication requests from transaction server computer 150. For example, the authentication server computer 120 may be part of a family of servers operated by third party authentication service. As illustrated in FIG. 1, the authentication server computer 120 includes a network interface 122, a processor 124, and memory 126. The network interface 122 includes, for example, adapters, such as SCSI target adapters and network interface adapters, for converting electronic and/or optical signals received from the communications medium 140 to electronic form for use by the authentication server computer 120. The processor 124 includes one or more processing chips and/or assemblies. In a particular example, the processor 124 includes multi-core CPUs. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is also constructed and arranged to store various data, for example, previous sets of device attributes 132, selected sets of device attributes 134, and comparison results 136. The memory 126 is further constructed and arranged to store a variety of software constructs realized in the form of executable instructions, such as a selection engine 128 and a comparison engine 130. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The previous sets of device attributes 132 include previous sets of device attributes 132(1), 132(2), 132(3), . . . , 132(M) of devices used in previous transactions. Each of the sets of device attributes 132 are expressed in a similar manner as the current set of device attributes 114, e.g., includes various software configuration settings that define a state of a previous device at a point in time. In some arrangements, the previous sets of device attributes 132 are device configuration settings of devices used in previous transactions known to have been fraudulent. In this case, a finding that the current set of device attributes 114 and any one of the previous sets of device attributes 132 are sufficiently similar may cause the authentication server computer 120 to indicate that the current transaction is risky.

The selected sets of device attributes 134 are a subset of the previous sets of device attributes 134 that represent the previous sets of device attributes most likely to be the same as the set of device attributes 114 of the current device 110. Again, because a set of device attributes of a device may change over time, the fact that two sets of device attributes are not exactly the same does not mean that the corresponding devices are not the same. The selected sets of device attributes 134 are output by the selection engine 128 as the most likely to be the same given the values of the features of the selected sets of device attributes 134 and those of the current set of device attributes 114.

The comparison results 136 are numbers output by the comparison engine 130 that indicate whether a selected set of device attributes 134 is the same as the current set of device attributes 114. In some arrangements, the numbers are output from a singular value decomposition (SVD) algorithm as the singular values of a matrix defined by the comparison engine 130. These singular values determine whether a selected set of device attributes is considered the same the current set of device attributes 114. For example, a singular value greater than a threshold indicates that the corresponding selected set of device attributes 134 is the same as the current set of device attributes 114. In some arrangements, such a threshold may be determined using a machine learning process based on feedback from test sets of device attributes and actual sets of device attributes used in previous transactions.

The selection engine 128 is software code that causes the processor 124 to select sets of device attributes 134 from the large pool of previous sets of device attributes 132 according to a likelihood of sameness to the set of device attributes 114. The selection process encoded within the selection engine 128 is arranged to perform a relatively fast evaluation of the current set of device attributes 114 in view of the previous sets of device attributes 132 using a modified locally sensitive hashing (LSH) algorithm.

The comparison engine 130 is software code that causes the processor 124 to compare the current set of device attributes 114 to each of the sets of device attributes 134 selected using the selection engine 128. The comparison process encoded within the comparison engine 130 is arranged to (i) generate a distance matrix defined by vector distances between features of a selected set of device attributes 134 and the current set of device attributes 114 and (ii) perform a SVD of the distance matrix to reveal the singular values that determine whether the sets of device attributes 114 and 134 are the same.

The transaction server computer 150 is constructed and arranged to receive transaction requests from devices such as the current device 110 and, in response, transmit authentication requests that include sets of device attributes such as the set of device attributes 114 to the authentication server computer 120 over the communications medium 140. The transaction server computer 150 is typically one of many servers used by an organization such as a bank or government agency, although the transaction server computer 150 may be a smaller computing device such as a personal computer, tablet computer, or smartphone.

The communications medium 140 provides network connections among the current device 110, the authentication server computer 120, and the transaction server computer 150. Communications medium 140 may implement any of a variety of protocols and topologies that are in common use for communications over the Internet. Furthermore, communications medium 140 may include various components (e.g., cables, switches/routers, gateways/bridges, etc.) that are used in such communications.

During operation, the user 116 transmits, via the current device 110, a request to process a transaction to the transaction server computer 150 over the communications medium 140. For example, the user 116 may be trying to make a credit card purchase over the Internet. In that case, the current device 110 may be a personal computer that runs an Internet browser that causes the computer 110 to transmit the request. Also, the transaction server computer 150 would belong to a credit card provider that processes the transaction.

In response, the transaction server computer 150 transmits an authentication request to the authentication server computer 120 over the communications medium 140. Again, the authentication request may contain details about the transaction and the identity of the user. The authentication request also contains the set of device attributes 114 of the current device 110 as additional information for determining the risk of carrying out the transaction.

Upon receipt of the authentication request, the authentication server computer 120 performs a risk analysis of the transaction given the information in the authentication request. As part of the risk analysis, the authentication server computer 120 invokes the selection engine 128 to perform a selection process to determine which of the large pool of previous sets of device attributes 132 will be compared to the current set of device attributes 114 contained in the transaction request.

FIG. 2B illustrates details of an example selection process 210 to be carried out by the processor 124. At 212, the process 210 causes the processor 124 to concatenate the characters representing the values of the features of the current set of device attributes 114 to produce a concatenated string. For the example presented in FIG. 2A, the concatenated string is "en-us en-us en-us|32|1680|1050 cuZzcH649F/ixBm=en-us Mozilla/5.0 (compatible; 67.241.176buffalousa". It should be understood that there is a space between each feature value in this example; this is by no means a requirement.

At 214, the process 210 causes the processor 124 to generate a signature from the concatenated string. In this case, the signature represents the output of a minhashing of a numerical representation of the concatenated string. Such a representation typically specifies a value of a first parameter, k, that represents a conversion of sections of the string to numbers. When two such signatures that represent two sets of device attributes, then it is extremely likely that the sets of device attributes are the same.

However, requiring the matching of such signatures to establish sameness of sets of device attributes very likely leads to false negatives. It is extremely unlikely, given that feature values of sets of device attributes typically change over time, that two signatures will ever match. Nevertheless, a likelihood of sameness may be established using a modified locally sensitive hashing (LSH) algorithm. This modified LSH algorithm breaks the signature up into subsignatures of a given length and hashes those subsignatures. Those hashed subsignatures are used to determine the likelihood of sameness.

Along these lines, at 216, the process 210 causes the processor 124 to generate subsignatures from the signature. Each of the subsignatures is a hash of a portion of the signature. The generation of the subsignatures is based on the values of two parameters: b, the number of pieces into which the subsignature is split and r, the number of separate hash functions applied to each subsignature.

At 218, each subsignature is matched to existing subsignatures derived in a similar fashion from the sets of device attributes 132. If a subsignature derived from the current set of device attributes 114 matches a subsignature derived from a previous set of device attributes, say 132(1), then the set of device attributes 132(1) is selected to be one of the selected sets of device attributes 134 because the likelihood that the two sets of device attributes are the same is high, and the likelihood that they are not the same is low.

It should be understood that the above process describes the selection process 210, and that the sets of device attributes 132 selected as a result of the selection process 210 are then compared to the current set of device attributes 114 to establish sameness. Details of the various elements of the process 210 are described in connection with FIGS. 3, 4, and 5.

Figure 3:
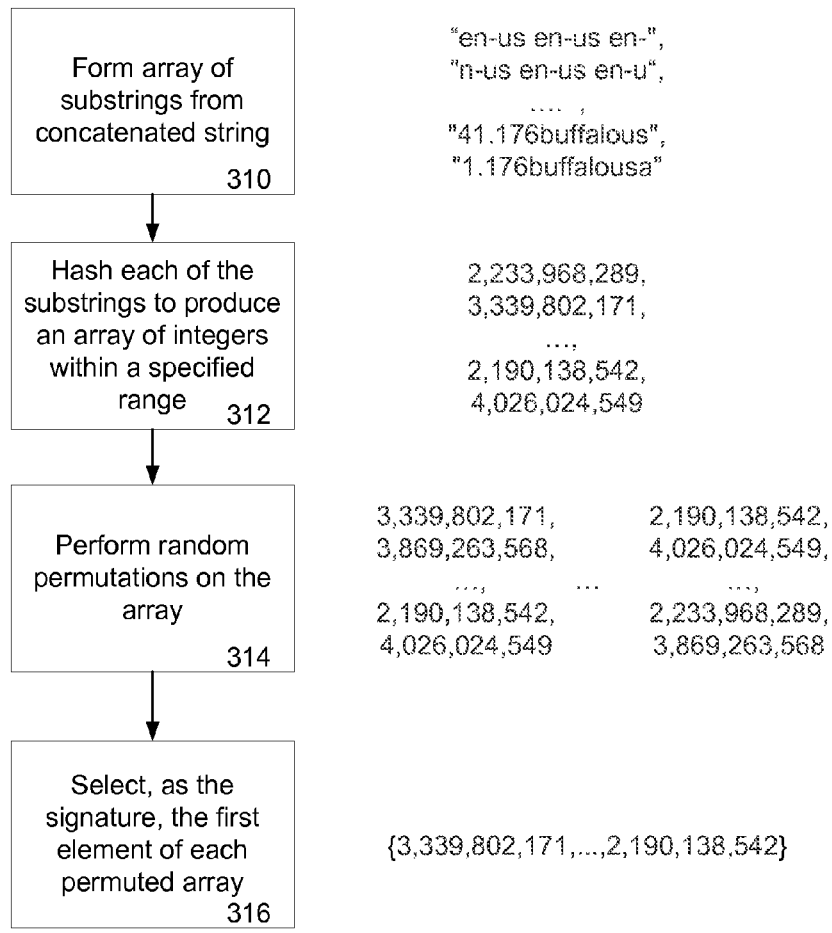
FIG. 3 is a flow chart illustrating an example signature generation within the electronic environment illustrated in FIG. 1.

FIG. 3 illustrates an example generation 214 of the signature. At 310, the process 210 causes the processor 124 to form an array of substrings from the concatenated string. Each substring is of length k and is formed as follows. (We assume for this example that k=7.) The first substring represents the first k characters of the concatenated string, or in this example "en-us e". The next substring is formed by shifting the previous substring to the right by one character, which is "n-us en". This process of forming the substrings continues until the last character of the last substring is the last character of the concatenated substring. When the concatenated string has K characters, then the number of substrings is K−k+1.

Because the substrings for each set of device attributes uses a lot of memory (7 bytes when k=7), the process performs a space-saving procedure reduces the number of bytes of each substring from 7 to 4. Along these lines, at 312, the process 210 causes the processor 124 to perform a hashing operation on each of the substrings to produce a reduced substring array. An example such operation is performed as follows for each substring:

convert each of the characters of the substring to ASCII representation,
  compact the range of numbers by subtracting 37 from each ASCII representation,
  if each ASCII representation is denoted as $x_1, x_2, \ldots, x_7$, then compute $x_1 \cdot 100^0 + x_2 \cdot 100^2 + \ldots + x_7 \cdot 100^{7-1}$ mod 4,294,967,291, where $4,294,967,291 = 2^{32}-5$ is a prime number less than $2^{32}$. In this way, while there is now a small probability that there will be collisions between distinct sets of attributes, the amount of memory used per substring is now 4 bytes rather than 7. Following this example recipe, the reduced substring array has elements 2,233,968,289; 3,339,802,171, and so on, until the last two elements are 2,190,138,542; and 4,026,024,549.

At 314, the process 210 causes the processor 124 to begin minhashing the current set of device attributes 114 by performing n random permutations of the reduced substring array, where n=b·r. Each of these permutations represents a hash function of the reduced substring array. For example, a first permutation of the array is 3,339,802,171; 3,869,263,568; . . . ; 2,190,138,542; 4,026,024,549. Another random permutation takes the form 2,190,138,542; 4,026,024,549; . . . ; 2,233,968,289; 3,869,263,568. The result is an array of permuted reduced substring arrays.

At 316, the process 210 causes the processor 124 to complete the minhashing of the current set of device attributes 114 by selecting the first element of each of the permuted reduced substring arrays to produce the signature of the current set of device attributes 114. For example, the signature is the array {3,339,802,171; . . . ; 2,190,138,542}.

Again, if two devices have the same signature, then they very likely match. For example, it turns out that the probability of two devices having the same signatures is equal to the Jaccard similarity of the two devices. However, other sets of device attributes 132 that do not have a matching signature may in fact be the same as the current set of device attributes 114. Thus, further steps are taken to reduce this chance of false negatives.

Figure 4:
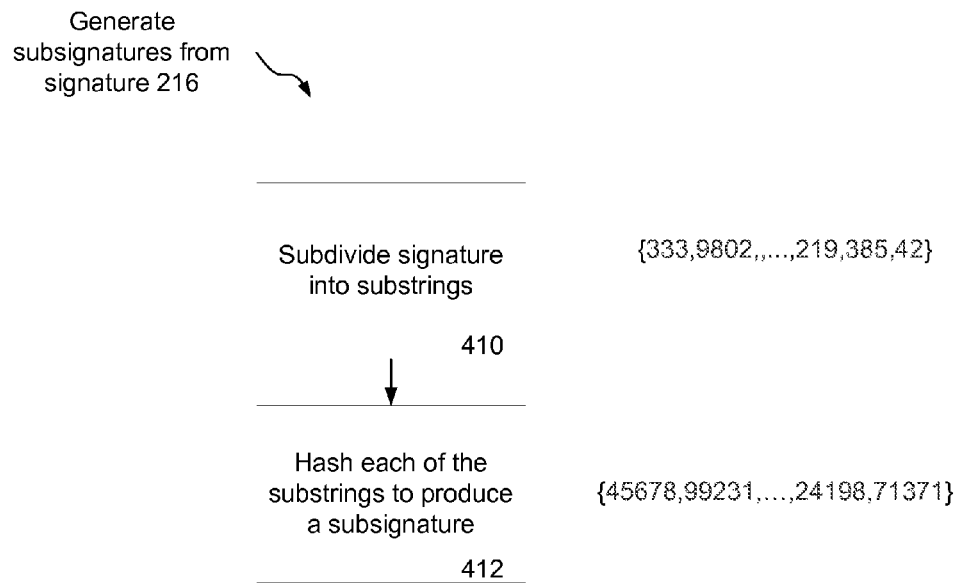
FIG. 4 is a flow chart illustrating an example subsignature generation within the electronic environment illustrated in FIG. 1.

FIG. 4 illustrates an example generation 216 of subsignatures as part of a modified LSH procedure. At 410, the process 210 causes the processor 124 to subdivide the signature of the current set of device attributes 114 into b substrings. For example, the substrings may be produce by concatenating the signature digits to form a numeric string and dividing the numeric string into b substrings. In some arrangements, each of the substrings has the same length although this by no means is a requirement.

At 412, the process 210 causes the processor 124 to apply a hash function to each of the substrings to produce a set of subsignatures. Thus, if each of the substrings of length $$r = \frac{b}{n}$$

is denoted as $r_1, r_2, \ldots, r_b$, then the hash of the $i^{th}$ substring is a subsignature denoted as $r_{int}^i$. Typical values of b and r may be, for example, 200 and 2, respectively. These subsignatures are matched to subsignatures derived similarly for the previous sets of device attributes 132.

FIG. 5 illustrates an example process of matching the subsignatures. The b subsignatures are each compared to elements of a hash table 510. The elements of the hash table 510 include entries containing a subsignature previously derived from a previous set of device attributes 132 and corresponding device identifiers. Thus, the matching process 218 involves locating, if possible, each subsignature within the hash table 510. If there is a match in an entry, then the sets of device attributes identified in the entry are selected for comparison as selected sets of device attributes 134. If not, then a new entry is created with the current set of device attributes 114 identified with the entry.

It turns out that the probability of two sets of device attributes that share a subsignature being the same is equal to $1-(1-p_{JS}^r)^b$, where $p_{JS}$ is the Jaccard similarity between the sets of device attributes. Thus, the choice of the parameters b and r can affect the likelihood of the two sets of device attributes being similar to some degree. Nevertheless, if the sets of device attributes are similar to begin with, then the probability given the same subsignature is very close to 1. Further, the probability of two sets of device attributes being different given the same subsignature is very small.

Once the processor 114 has formed the set of selected sets of device attributes 134, then the selected sets of device attributes 134 may be compared more thoroughly to the current set of device attributes 114. The process of comparing the sets of device attributes is described in connection with FIG. 6.

FIG. 6 illustrates an example device comparison process 610. At 612, the process 610 causes the processor 124 to form a similarity matrix 620 of vector distances between the selected sets of device attributes 134 and the current set of device attributes 114. The vector difference in this context is represented as a triplet of binary numbers taking one of the following values:
- (1,0,0) if a feature value of the selected set of device attributes 134 is equal to the feature value of the current set of device attributes 114,
- (0,1,0) if there is not enough information to known if one feature of the selected set of device attributes 134 is equal to the feature value of the current set of device attributes 114, and
- (0,0,1) if a feature value of the selected set of device attributes 134 is not equal to the feature value of the current set of device attributes 114.

When there are 9 device features under consideration, the similarity matrix has 27 columns and P rows, where P is the number of selected sets of device attributes.

At 614, the process 610 causes the processor 124 to perform a singular value decomposition (SVD) of the similarity matrix 620. The SVD returns a set of singular values indicating the likelihood that the corresponding sets of device attributes 134 are the same as the current set of device attributes 114. In some arrangements, if a singular value is greater than a threshold, then the corresponding set of device attributes 134 is deemed to be the same as the current set of device attributes 114.

Figure 7:
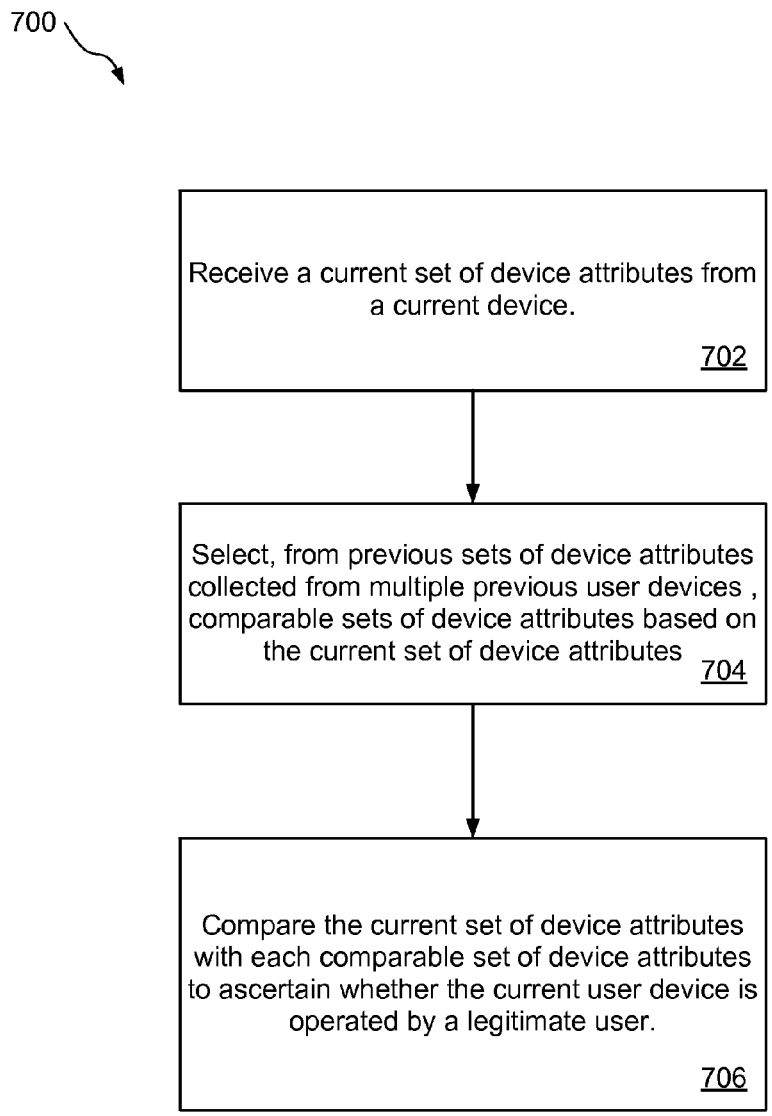
FIG. 7 is a flow chart illustrating a method of carrying out the improved technique within the electronic environment illustrated in FIG. 1.

FIG. 7 illustrates a method 700 of detecting fraudulent activity. The method 700 may be performed by the software constructs described in connection with FIG. 1, which reside in the memory 126 of the authentication server computer 120 and are run by the processor 124.

At 702, a current set of device attributes is received from a current user device. For example, the current set of device attributes 114 includes configuration settings of the current device 110.

At 704, comparable sets of device attributes are selected from multiple, previous sets of device attributes based on the current set of device attributes. The selection operation 210 is designed to be much faster than the full comparison operation and thus allows for consideration of a large pool of sets of device attributes.

At 706, each of the comparable set of device attributes is compared to the current set of device attributes to produce a comparison result to ascertain whether the current user device is operated by a legitimate user. Thus, the slower comparison is performed after the selection has reduced the pool of previous devices to a number where the comparison can be feasibly carried out within the context of an authentication operation.

Improved techniques of performing authentication involve comparing current user authentication factors with previous authentication factors selected from multiple users during a single authentication session. Along these lines, suppose that an authentication server receives current browser characteristics from a user computer during a current authentication session. Based on the current browser characteristics, the authentication server selects previous browser characteristics received from devices used by multiple users during previous authentication sessions. For example, the authentication server may select previous browser characteristics based on the whether any of the results of a modified, locally sensitive hashing (LSH) of the previous browser characteristics match any of the results of a modified LSH of the current browser characteristics. After the authentication server selects the previous browser characteristics, the authentication server compares those selected, previous browser characteristics with the current browser characteristics. If there is a close match, then it is likely that the current browser characteristics were received from a fraudster attempting to authenticate as different users while using the same computer.

While various embodiments of the present disclosure have been particularly shown and described, it will be understood by those skilled in the art that various changes in form and details may be made therein without departing from the spirit and scope of the present disclosure as defined by the appended claims.

For example, although the example presented herein involves reducing the memory footprint of substrings of a concatenated string by hashing an ASCII representation of each substring, no such step is necessary if memory is not an issue.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 740 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:
1. A computer-based method of performing authentication, the method comprising:
   receiving, by processing circuitry, a current set of device attributes from a current user device;
   selecting, from previous sets of device attributes collected from multiple previous user devices and by the pro- cessing circuitry, comparable sets of device attributes based on the current set of device attributes; and comparing, by the processing circuitry, the current set of device attributes with each comparable set of device attributes to ascertain whether the current user device is operated by a legitimate user;

wherein comparing the current set of device attributes with each comparable set of device attributes includes:
forming a vector distance between the current set of device attributes and each comparable set of device attributes; and
deriving similarity values for each of the comparable sets of device attributes based on the vector distance between the current set of device attributes and that comparable set of device attributes, a similarity value being indicative of whether a previous device is the same as the current device;

wherein selecting the comparable sets of device attributes further includes:
concatenating characters representing the current set of device attributes to form a concatenated string;
producing a signature of the current device based on the concatenated string;
generating a set of subsignatures from the signature;
performing a matching operation that indicates whether each of the set of subsignatures matches a previous subsignature of a set of previous subsignatures, the set of previous subsignatures being generated from signatures of the multiple previous devices; and
producing the comparable sets of device attributes based on results of the matching operation; and wherein the method further comprises:
in response to a set of comparison results from the comparing step, providing a control message to a transaction server, the control message being operative to control completion of a transaction by the transaction server.

2. A method as in claim 1, wherein producing the signature of the current device based on the concatenated string includes:
forming an array of substrings from the concatenated string;
performing a specified number of random permutation operations on the array of substrings to form a set of permuted arrays; and
forming, as the signature of the current device, a string that includes the first element of each of the set of permuted arrays.

3. A method as in claim 2, wherein forming the array of substrings includes producing consecutive substrings of a specified length, each consecutive substring beginning with a consecutive character of the concatenated string.

4. A method as in claim 3, wherein forming the array of substrings further includes performing a hashing operation on each of the consecutive substrings to generate, as the array of substrings, an array of integers having a specified range.

5. A method as in claim 1, wherein generating the set of subsignatures includes:
subdividing the signature of the current device into a set of substrings of a specified length; and
performing a hashing operation on each of the set of substrings to produce a subsignature of the set of subsignatures.

6. A method as in claim 1, further comprising generating a table of the previous subsignatures, each entry of the table including a subsignature and a corresponding previous set of device attributes, and
wherein performing the matching operation includes, for each of the set of subsignatures:
locating, as a result of the matching operation, an entry of the table that includes a previous subsignature matching that subsignature; and
adding the previous set of device attributes of the located entry to the comparable sets of device attributes.

7. A method as in claim 1, wherein deriving similarity values for each of the comparable sets of device attributes includes:
forming a similarity matrix, each element of the similarity matrix including a vector distance between a device attribute of the current set of device attributes and the device attribute of that comparable set of device attributes; and
performing a singular value decomposition operation on the similarity matrix to produce a set of singular values, each of the set of singularity values indicating whether the current device and a previous device are the same.

8. A method as in claim 7, wherein forming the similarity matrix includes:
defining, as the vector distance between the device attribute of the current set of device attributes and the device attribute of that comparable set of device attributes, a triplet of binary numbers, the value of the triplet depending on whether the device attribute of the current set of device attributes and the device attribute of that comparable set of device attributes are the same.

9. A method as in claim 1, wherein the transaction server is different from the current user device; and
wherein receiving the current set of device attributes from the current user device includes:
obtaining, from the transaction server, an authentication request message containing the current set of device attributes, the authentication request message being sent from the transaction server to the processing circuitry in response to a request to process the transaction sent from the current user device to the transaction server.

10. A method as in claim 9, wherein the transaction is a credit card purchase; and
wherein providing the control message to the transaction server includes:
indicating successful authentication to enable the transaction server to complete the credit card purchase.

11. A method as in claim 9, wherein the transaction is a credit card purchase; and
wherein providing the control message to the transaction server includes:
indicating unsuccessful authentication to prevent the transaction server from completing the credit card purchase.

12. A computer program product including a non-transitory, computer-readable storage medium which stores executable code, which when executed by a computer, causes the computer to perform a method of performing authentication, the method comprising:
receiving a current set of device attributes from a current user device;
selecting, from previous sets of device attributes collected from multiple previous user devices, comparable sets of device attributes based on the current set of device attributes; and
comparing the current set of device attributes with each comparable set of device attributes to ascertain whether the current user device is operated by a legitimate user;
wherein comparing the current set of device attributes with each comparable set of device attributes includes:
forming a vector distance between the current set of device attributes and each comparable set of device attributes; and deriving similarity values for each of the comparable sets of device attributes based on the vector distance between the current set of device attributes and that comparable set of device attributes, a similarity value being indicative of whether a previous device is the same as the current device;

wherein selecting the comparable sets of device attributes further includes:

concatenating characters representing the current set of device attributes to form a concatenated string;

producing a signature of the current device based on the concatenated string;

generating a set of subsignatures from the signature;

performing a matching operation that indicates whether each of the set of subsignatures matches a previous subsignature of a set of previous subsignatures, the set of previous subsignatures being generated from signatures of the multiple previous devices; and producing the comparable sets of device attributes based on results of the matching operation; and wherein the method further comprises:

in response to a set of comparison results from the comparing step, providing a control message to a transaction server, the control message being operative to control completion of a transaction by the transaction server.

13. A computer program product as in claim 12, wherein producing the signature of the current device based on the concatenated string includes:

forming an array of substrings from the concatenated string;

performing a specified number of random permutation operations on the array of substrings to form a set of permuted arrays; and forming, as the signature of the current device, a string that includes the first element of each of the set of permuted arrays.

14. A computer program product as in claim 13, wherein forming the array of substrings includes producing consecutive substrings of a specified length, each consecutive substring beginning with a consecutive character of the concatenated string.

15. A computer program product as in claim 14, wherein forming the array of substrings further includes performing a hashing operation on each of the consecutive substrings to generate, as the array of substrings, an array of integers having a specified range.

16. A computer program product as in claim 12, wherein generating the set of subsignatures includes:

subdividing the signature of the current device into a set of substrings of a specified length; and performing a hashing operation on each of the set of substrings to produce a subsignature of the set of subsignatures.

17. A computer program product as in claim 12, further comprising generating a table of the previous subsignatures, each entry of the table including a subsignature and a corresponding previous set of device attributes, and wherein performing the matching operation includes, for each of the set of subsignatures:

locating, as a result of the matching operation, an entry of the table that includes a previous subsignature matching that subsignature; and adding the previous set of device attributes of the located entry to the comparable sets of device attributes.

18. A computer program product as in claim 12, wherein deriving similarity values for each of the comparable sets of device attributes includes:

forming a similarity matrix, each element of the similarity matrix including a vector distance between a device attribute of the current set of device attributes and the device attribute of that comparable set of device attributes; and performing a singular value decomposition operation on the similarity matrix to produce a set of singular values, each of the set of singularity values indicating whether the current device and a previous device are the same.

19. An electronic apparatus constructed and arranged to perform authentication, the electronic apparatus comprising:

memory; and processing circuitry coupled to the memory, the processing circuitry being constructed and arranged to:

receive a current set of device attributes from a current user device;

select, from previous sets of device attributes collected from multiple previous user devices, comparable sets of device attributes based on the current set of device attributes; and compare the current set of device attributes with each comparable set of device attributes to ascertain whether the current user device is operated by a legitimate user;

wherein the processing circuitry, when comparing the current set of device attributes with each comparable set of device attributes, is constructed and arranged to:

form a vector distance between the current set of device attributes and each comparable set of device attributes; and derive similarity values for each of the comparable sets of device attributes based on the vector distance between the current set of device attributes and that comparable set of device attributes, a similarity value being indicative of whether a previous device is the same as the current device;

wherein the processing circuitry, when selecting the comparable sets of device attributes, is constructed and arranged to:

concatenate characters representing the current set of device attributes to form a concatenated string;

produce a signature of the current device based on the concatenated string;

generate a set of subsignatures from the signature;

perform a matching operation that indicates whether each of the set of subsignatures matches a previous subsignature of a set of previous subsignatures, the set of previous subsignatures being generated from signatures of the multiple previous devices; and produce the comparable sets of device attributes based on results of the matching operation; and wherein the processing circuitry is further constructed and arranged to:

in response to a set of comparison results from the comparison of the current set of device attributes with each comparable set of device attributes, provide a control message to a transaction server, the control message being operative to control completion of a transaction by the transaction server.

* * * * *